United States Patent
Puvvula et al.

(10) Patent No.: US 11,627,215 B1
(45) Date of Patent: Apr. 11, 2023

(54) SMART USAGE MONITORING AND ACCESS CONTROL OF WEB AND MOBILE APPLICATIONS

(71) Applicant: Life360, Inc., San Francisco, CA (US)

(72) Inventors: Naveen Puvvula, Fremont, CA (US); Nitin Bhandari, Pleasanton, CA (US); Jack Furr, Scotts Valley, CA (US)

(73) Assignee: Life360, Inc., San Francisco, CA (US)

( * ) Notice: Subject to any disclaimer, the term of this patent is extended or adjusted under 35 U.S.C. 154(b) by 0 days.

(21) Appl. No.: 16/276,409

(22) Filed: Feb. 14, 2019

Related U.S. Application Data

(60) Provisional application No. 62/630,478, filed on Feb. 14, 2018.

(51) Int. Cl.
*H04M 1/72463* (2021.01)
*G06F 11/34* (2006.01)
*H04L 67/50* (2022.01)

(52) U.S. Cl.
CPC ..... *H04M 1/72463* (2021.01); *G06F 11/3438* (2013.01); *H04L 67/535* (2022.05); *G06F 2221/2137* (2013.01)

(58) Field of Classification Search
CPC ............... H04M 1/72577; H04L 67/22; G06F 11/3438; G06F 2221/2137
See application file for complete search history.

(56) References Cited

U.S. PATENT DOCUMENTS

| | | | |
|---|---|---|---|
| 6,678,824 B1 * | 1/2004 | Cannon | A63F 13/10 726/22 |
| 8,015,249 B2 | 9/2011 | Nayak et al. | |
| 8,484,568 B2 | 7/2013 | Rados et al. | |
| 8,713,535 B2 | 4/2014 | Malhotra et al. | |
| 9,137,701 B2 | 9/2015 | Raleigh et al. | |
| 9,369,537 B1 * | 6/2016 | Mathew | H04M 1/67 |
| 9,560,405 B2 | 1/2017 | McClure et al. | |
| 10,021,169 B2 | 7/2018 | Hendrick et al. | |
| 10,171,305 B2 | 1/2019 | Corson | |
| 2003/0131094 A1 * | 7/2003 | Awada | G06F 9/468 709/224 |
| 2004/0121841 A1 * | 6/2004 | Xidos | G07F 17/32 463/40 |
| 2005/0183143 A1 * | 8/2005 | Anderholm | G06F 11/3438 726/22 |

(Continued)

OTHER PUBLICATIONS

Will Knight, "The Dark Secret at the Hear of AI", May 18, 2017, MIT Technology Review, vol. 120, No. 3, pp. 54-63 (Year: 2017).*

(Continued)

*Primary Examiner* — Nicholas Klicos
(74) *Attorney, Agent, or Firm* — Womble Bond Dickinson (US) LLP

(57) ABSTRACT

Systems and methods for software application usage detection on a user device and other computing device are disclosed. The software application usage detection is done by monitoring the network usage of the application or by usage recognition using methods provided by operating systems. The system identifies a set of applications and monitors their usage. The system is enabled to monitor the behaviors of users and control the same using smart rules set up based on user preferences to prevent over usage and usage in un-acceptable conditions.

19 Claims, 16 Drawing Sheets

(56) References Cited

U.S. PATENT DOCUMENTS

| | | | |
|---|---|---|---|
| 2014/0113593 A1* | 4/2014 | Zhou | H04L 63/20 455/411 |
| 2015/0079965 A1* | 3/2015 | Mullins | H04W 8/20 455/419 |
| 2015/0127819 A1 | 5/2015 | Cimino et al. | |
| 2016/0005016 A1* | 1/2016 | Eliahu | G06F 21/10 705/44 |
| 2016/0036749 A1* | 2/2016 | Bansal | H04L 65/1069 709/206 |
| 2016/0246476 A1* | 8/2016 | Harris | G06F 16/24578 |
| 2016/0267257 A1* | 9/2016 | Wisgo | G06F 21/105 |
| 2017/0041454 A1* | 2/2017 | Nicholls | H04L 43/08 |
| 2017/0148264 A1* | 5/2017 | Pichette | G06Q 20/123 |
| 2017/0346713 A1 | 11/2017 | Cimino et al. | |
| 2018/0054493 A1 | 2/2018 | Heilpern et al. | |
| 2018/0335921 A1* | 11/2018 | Karunamuni | G06F 3/0488 |
| 2018/0350173 A1* | 12/2018 | Smith | G06F 21/604 |
| 2019/0222895 A1* | 7/2019 | Petander | H04N 21/41407 |

OTHER PUBLICATIONS

Arjun Kharpal, "Offtime app wants you to stop using your phone", Mar. 26, 2015, CNBC.com, accessed on Aug. 9, 2021, accessed from <https://www.cnbc.com/2015/03/26/offtime-app-wants-you-to-stop-using-your-phone.html>, pp. 1-4 (Year: 2015).*

Jeremy Goldman, "6 Apps to Stop Your Smartphone Addiction", Oct. 21, 2015, Inc.com, accessed on Aug. 9, 2021, accessed from <https://www.inc.com/jeremy-goldman/6-apps-to-stop-your-smartphone-addiction.html>, pp. 1-4 (Year: 2015).*

\* cited by examiner

Annabell used Facebook 24 times yesterday

Enable "Zen Breaks" to take some break throughout the day

Enable Zen Breaks / 810

Figure 8

SMART USAGE MONITORING AND ACCESS CONTROL OF WEB AND MOBILE APPLICATIONS

CROSS REFERENCE TO RELATED APPLICATIONS

This application claims the benefit of U.S. Provisional Application No. 62/630,478 filed on Feb. 14, 2018, the disclosure of which is incorporated herein by reference.

TECHNICAL FIELD

Embodiments of the disclosure relate to software application usage detection and control, specifically to limit over exposure and limit use in unacceptable conditions.

BACKGROUND

User distraction on a client computing device (e.g., a computer or mobile device, such as smartphone or tablet) is an issue that is of concern in different scenarios. Typical usage of networked handheld computing devices involves running applications (also referred to as application software, apps or app) and accessing the web to interact with other users over social networks on the Internet. Over exposure to apps and the Internet can cause issues leading to reduced mental and emotional wellness, to reduction in employee productivity, and to distracted driving. The human tendency to repeatedly check or respond to, for example, social media notifications or emails can, at the very least, be annoying or outright dangerous. There exists a need, therefore, for an intelligent system that can monitor and control a user's tendency to initiate ongoing and repeated network access based on rules set up that automatically limit such behavior based on user preference.

BRIEF DESCRIPTION OF THE DRAWINGS

Embodiments of the disclosure are illustrated by way of example and not limitation in the figures of the accompanying drawings in which like references indicate similar elements.

FIG. 8 is an example of a contextual prompt according to one embodiment.

DETAILED DESCRIPTION

Figure 1A:
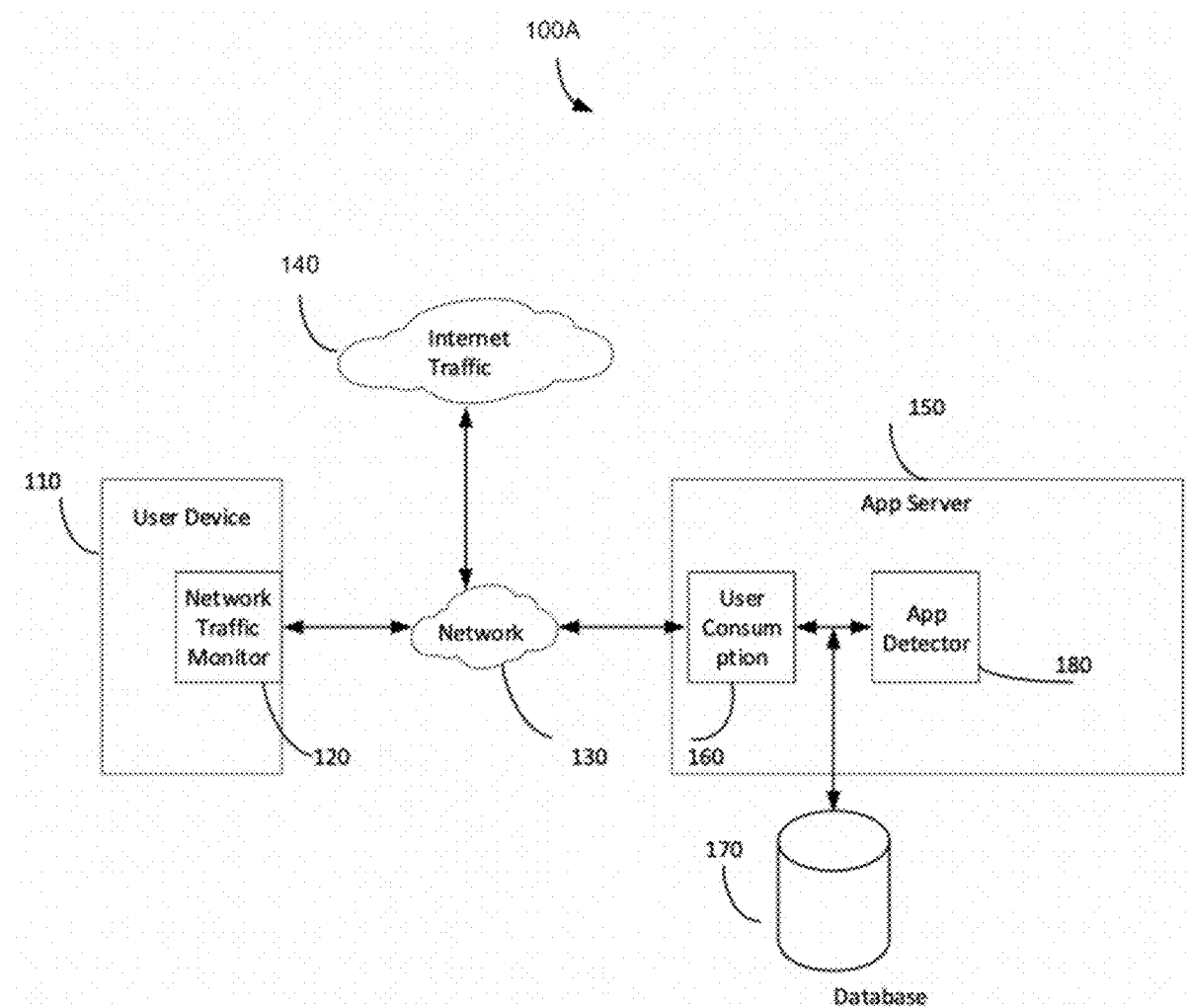
FIG. 1A is an exemplary block diagram of a system to detect network access for app usage and social web usage according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The systems and methods for software application usage detection on a mobile and other computing device are disclosed. The software application usage detection is done by monitoring the network usage of the application or by usage recognition using methods provided by operating systems. The system identifies a set of applications and monitors their usage. The system is enabled to monitor the behaviors of users and control the same using smart rules set up based on user preferences to prevent over usage and usage in un-acceptable conditions.

Systems and methods for software application usage detection on a user device are disclosed. The software application usage detection is done by monitoring the network usage of the application in the discussed embodiment, but it may also be handled by using methods provided by some operating systems having the built in capability to do that. The embodiments are described in terms of a user device, but it is not to be considered limiting. The system and methods described are applicable to any user device having computing and communication capabilities.

According to some embodiments, systems and methods for controlling software application usage on a user device are described. In one aspect, access to a software application on the user device is detected. A first state associated with the software application is established. Whether one or more triggering criteria are satisfied are determined, where the triggering criteria are used to control access to the software application. In response to determining that the one or more triggering criteria are satisfied, a second state associated with the software application is moved to, where access to the software application is enabled for a first time period in the second state. Whether the first time period has elapsed is determined. In response to determining that the first time period has elapsed, a third state associated with the software application is moved to, where access to the software application is disabled for a second time period in the third state.

In some embodiments, whether the second time period has elapsed is determined. In response to determining that the second time period has elapsed, the first state is returned to, where normal access to the software application is enabled in the first state.

In some embodiments, in response to determining that the one or more triggering criteria are satisfied, a user of the user device is notified that access to the software application will be disabled after the first time period. In some embodiments, in response to determining that the first time period has elapsed, the user of the user device is notified that access to the software application is disabled for the second time period.

Figure 1B:
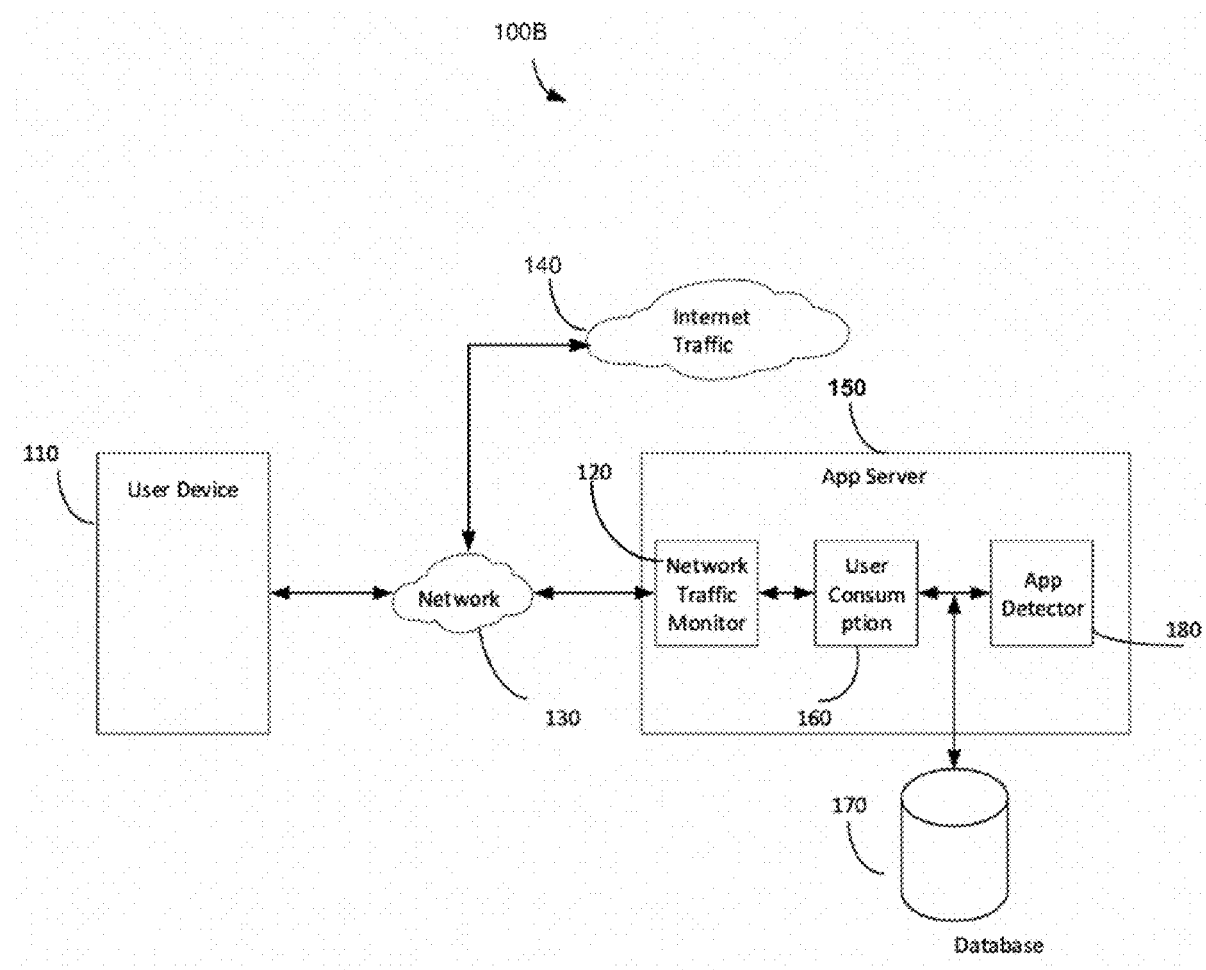
FIG. 1B is an exemplary block diagram of a system to detect network access for app usage and social web usage according to another embodiment.
Figure 1C:
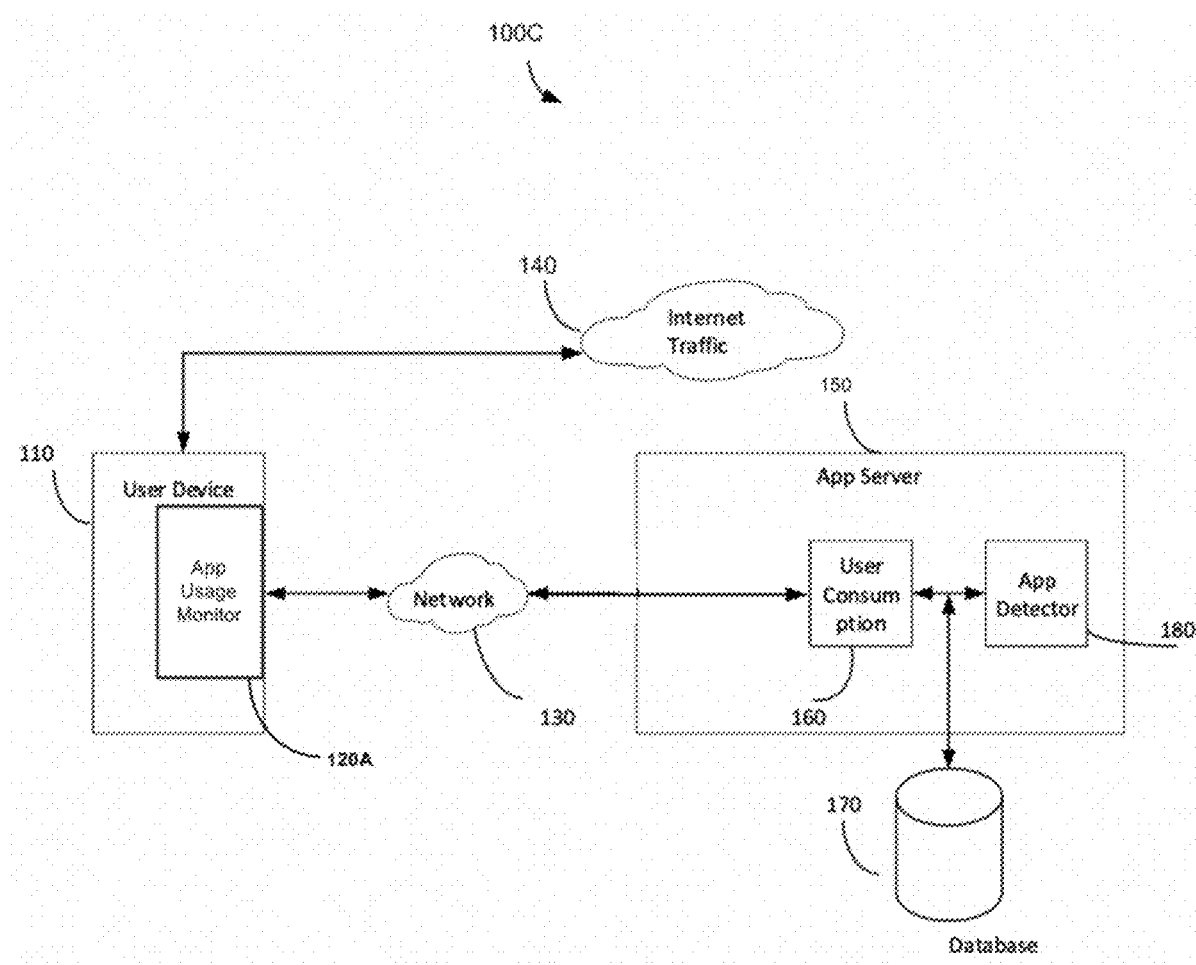
FIG. 1C is an exemplary block diagram of a system to detect app usage and social web usage according to yet another embodiment.

FIGS. 1A, 1B and 1C are exemplary block diagrams of systems to detect app usage and social web usage according to some embodiments. Referring to FIGS. 1A and 1B, systems 100A and 100B include user device 110 interfacing with network 130. In one embodiment, user devices 110 may be a mobile device (e.g., smartphone, tablet), a laptop computer, a desktop computer, a wearable device (e.g., smartwatch), a vehicle (e.g., autonomous vehicle), or the like. In one embodiment, network 130 may be any type of networks such as a local area network (LAN), a wide area network (WAN) such as the Internet, a cellular network, a satellite network, or a combination thereof, wired or wireless.

FIG. 1C is an exemplary block diagram of a system to detect app usage and social web usage according to another embodiment. In one embodiment, in system 100C of FIG. 1C, an operating system running on user device 110 is used to recognize and quantify app usage (as described in more detail herein below with respect to app usage monitor 120A). In some embodiments, control software may be installed on user device 110 having the operating system running thereon, and is able to provide app usage controls using capabilities of the operating system based on inputs received as per pre-established rules.

Figure 2:
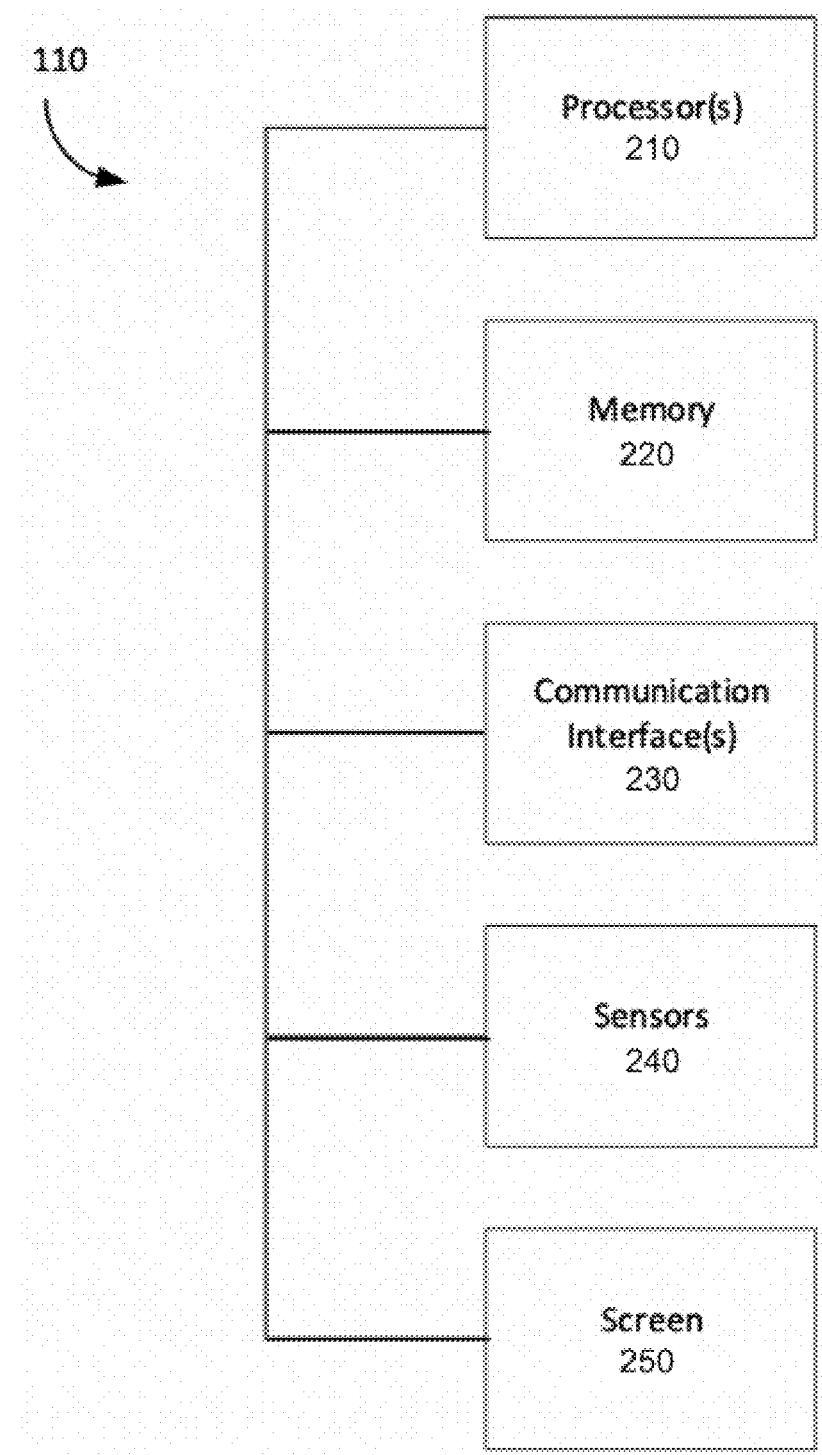
FIG. 2 shows an exemplary block diagram of a user device according to one embodiment.

Referring to FIG. 2, which shows an exemplary block diagram of user device 110, user device 110 may include one or more processors 210, memory 220, sensors 240 (e.g., global positioning system (GPS), gyroscope, accelerometer, etc.), and communication interfaces 230, such as 3G, 4G, 5G, long term evolution (LTE) modem, Wi-Fi, Ethernet, etc., and an I/O module such as a screen 250 (e.g., display, touch screen, video monitor, etc.). The user device 110 may be a computing device capable of running operating systems such as iOS®, Android®, Windows®, Mac, ChromeOS, and so on.

Referring back to FIGS. 1A-1C, a software application program on the user device 110 may access Internet 140 via network 130 using communication interfaces 230 shown in FIG. 2. Examples access of Internet 140 includes playing games, accessing social media networks, playing music or videos, updating of an app, prefetching data to populate apps like email/WhatsApp, etc. With reference to FIG. 1A, in one embodiment, system 100A includes a network traffic monitor 120, which may be a network traffic monitor configured to monitor, store and upload network traffic usage data by user device 110 to app server 150 over network 130. The network traffic usage data includes any application network requests (e.g., any Internet traffic or access by user device 110) to servers (not explicitly shown) on Internet 140 and any traffic from servers on the Internet 140 to the application software running on user device 110. Network traffic monitor 120, in one embodiment, runs on user device 110, or in another embodiment, runs on the app server 150. In system 100A of FIG. 1A, network traffic monitor 120 is shown to run on user device 110. In system 100B of FIG. 1B, network traffic monitor 120 runs on app server 150. In one embodiment, Internet traffic from servers on Internet 140 to user device 110 is also routed to app server 150 via network 130. In another embodiment, the network traffic monitor 120 may be anywhere on the network 130, e.g. on a network router (not explicitly shown).

The network traffic usage data collected by the network monitor 120 is provided to user consumption module 160. In system 100C of FIG. 1C, an operating system running on user device 110 may provide app usage detection capability to collect and provide user consumption data directly to user consumption module 160. The user consumption module 160 characterizes network traffic usage data and/or user consumption data for processes/apps on user device 110. This collected data may be saved in database 170 as network consumption data with the help of app detector 180. In one embodiment, user consumption module 160 is configured to provide feedback data or commands associated with the apps running on the user device 110. In one embodiment, app detector 180 analyzes the network traffic usage data and identifies applications, and performs time allotments of the applications executing on the user device 110 and identifies applications for the processes by analyzing the network consumption data stored in database 170. The application detector 180 derives usage information for applications executing on the user device 110 by aggregating network consumption data associated with applications over time. The derived information may include a list of applications that are being used or executed on the user device 110, usage data for each application, among other things. The application detector 180 may further update the usage data, such as by modifying usage time parameters (e.g., usage time, usage time line, etc.) based on analyzing properties of the network consumption data. The application detector 180 generates and provides reports of the usage data for applications on user device 110, or another device (not shown).

In various embodiments, the systems and methods described herein aim to monitor and identify a set of application usage behaviors of users and control the same using smart rules and user preferences. The various methods used may include:
1. Method/implementation generates a trigger based on specific usage patterns, and/or
2. Action performed on the user/device application usage once the trigger has occurred.

The use cases that are considered for user device 110 (e.g., applications running on a client device, such as a computer or a mobile device) are as follows:
1. High frequency/long time use of particular applications or programs (herein referred to as "apps"); that is using a particular set of addictive (or reward based) applications very frequently. This can result in fatigue and cause distraction. Examples of such applications are Snapchat, Instagram®, Facebook®, Twitter®, and so on. In one embodiment, usage activity is associated with network requests characterized by frequent bursts of small usages. In another embodiment, usage activity is associated with information provided related to application activity directly.

2. Long usage in terms of duration of video sharing or video streaming apps such as Youtube®, Netflix®.

Figure 3A:
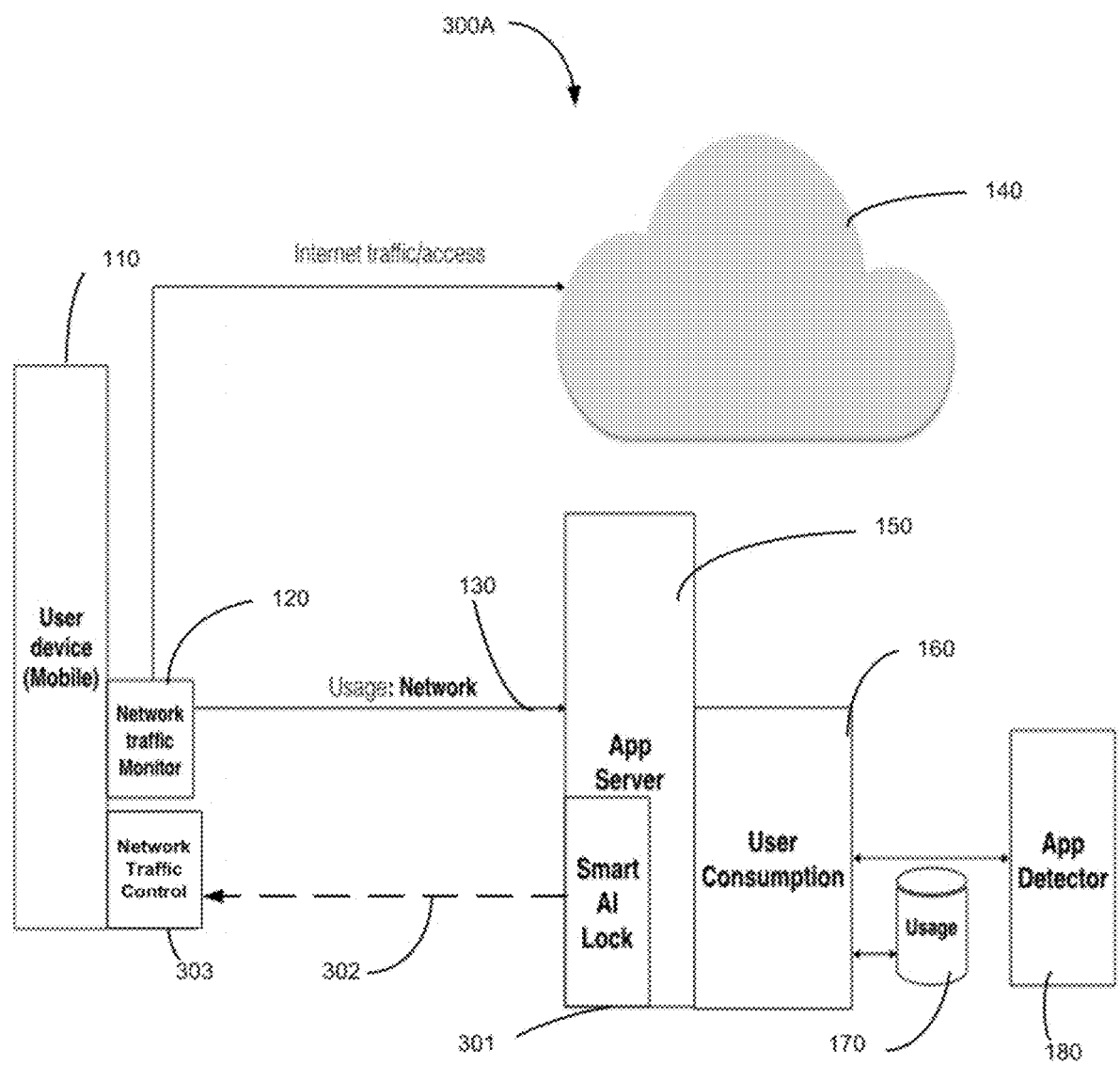
FIG. 3A is an exemplary block diagram of a system having a network traffic monitor and network traffic control according to one embodiment.
Figure 3B:
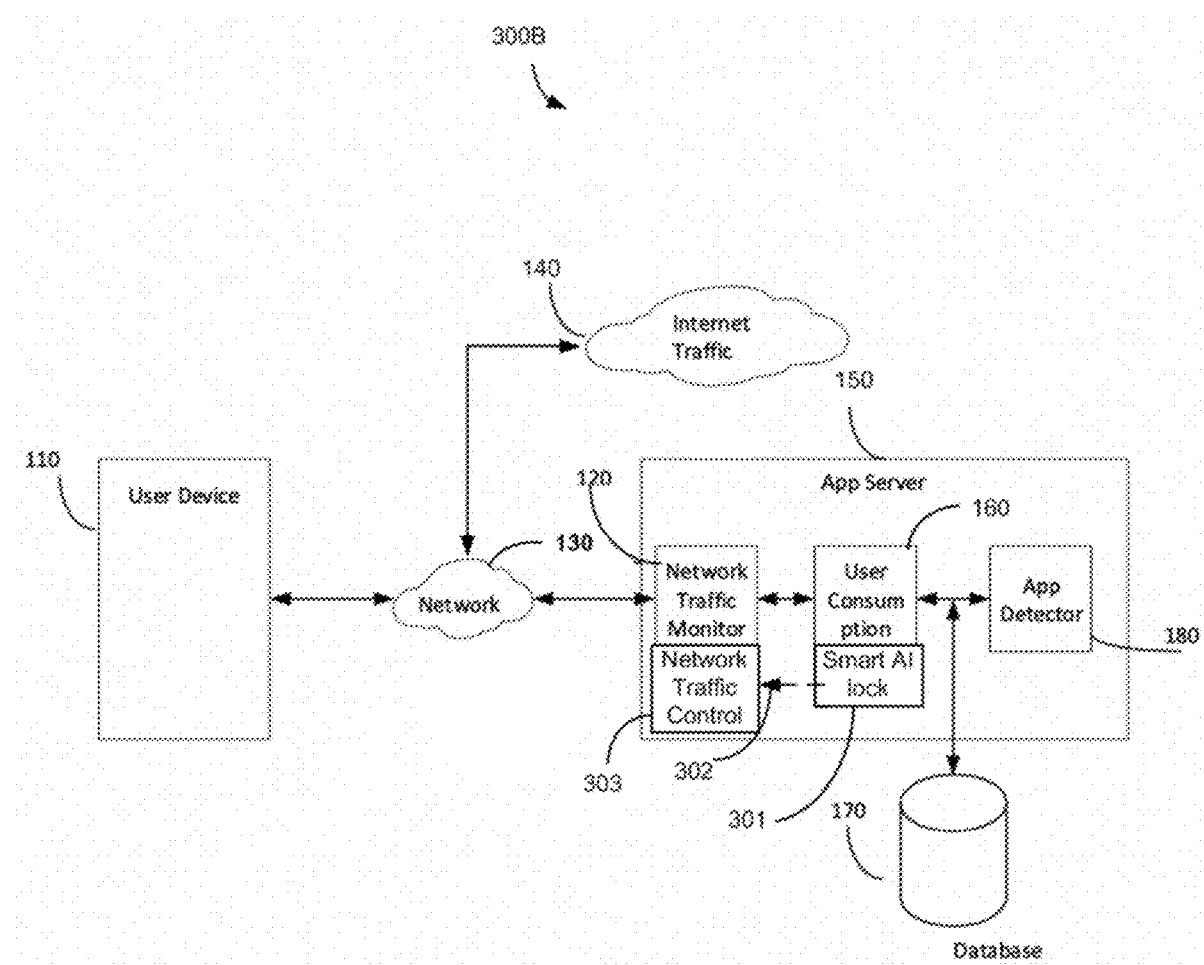
FIG. 3B is an exemplary block diagram of a system having a network traffic monitor and network traffic control according to another embodiment.
Figure 3C:
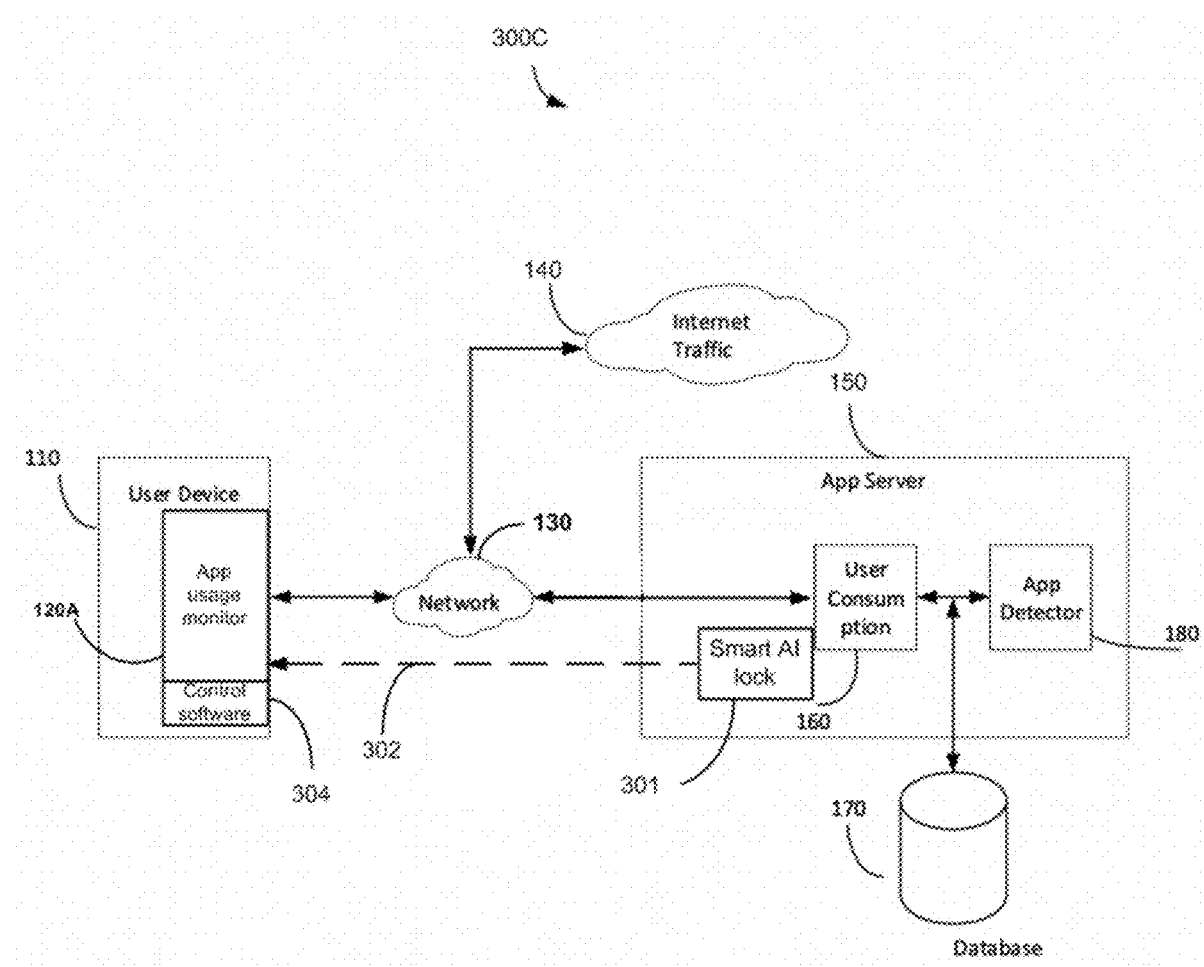
FIG. 3C is an exemplary block diagram of a system having an app usage monitor and control software according to one embodiment.

FIGS. 3A and 3B are exemplary block diagrams of systems having a network traffic monitor and network traffic control according to some embodiments. FIG. 3C is an exemplary block diagram of a system having an app usage monitor and control software according to one embodiment. In FIG. 3C, system 300C uses an operating system based app usage monitor 120A (i.e., an app usage detection capability) on the user device 110 to enable locking out the user device 110 in order to remove distraction during certain conditions and also to limit the user device 110 from over usage of app and Internet based on pre-established or predetermined rules.

Referring to FIGS. 3A and 3B, user device 110 with network traffic monitor 120 configured to run on user device 110 (as shown in FIG. 3A) or a server, such as the app server 150 (as shown in FIG. 3B). The network traffic monitor 120 collects network traffic usage data associated with app network requests and any other Internet traffic or access by user device 110 and sends the data to app server 150. As indicated previously, the network traffic monitor 120 may be installed to run on either user device 110 or server 150. Also, in some operating systems (e.g., iOS®), monitoring can be done using a virtual private network (VPN) connection and using OS-provided mechanisms instead of the network traffic monitor 120. In some embodiments, user device 110 may be a computing device running an operating system, such as iOS®, Android®, Windows®, Mac®, ChromeOS, and so on, that is able to access Internet 140. While FIG. 3A shows user device 110, the systems and methods described herein can be applied to any computing system configured to access network 130. The app server 150 receives the network traffic usage data collected and send by the network traffic monitor 120 and feed this data to user consumption module 160. The user consumption module 160 characterizes the network traffic usage data and save this data to a usage memory unit (or database) 170 with the help of app detector 180 (also referred to as appdetector module 180). The appdetector module 180 analyzes the network traffic usage data and identifies applications and performs time allotment to the applications. The user consumption module 160 generates feedback data associated with the app, where the feedback data is transmitted to smart artificial intelligence (AI) lock module 301. The user consumption module 160 sends the feedback data to smart AI lock module 301. The smart AI lock module 301 is used to determine whether app usage (or usage of a group of apps) by user device 110 has exceeded a certain threshold (e.g., a specified time threshold or a number of times the user has used the app). The thresholds are set up by pre-established rules to control the behavior of the user device 110 and are provided to the smart AI lock module 301. If the thresholds have been exceeded, then the smart AI lock module 301 provides instructions 302 over network 130 to network traffic control module 303 associated with user device 110 to block the app or group of apps based on the established rules for a specified time period. The smart AI lock module 301 (operating in conjunction with the network traffic control module 303) implements the control features based on the set of pre-determined smart lock rules that are used to implement the smart lock controls. FIG. 3B is another embodiment where the network traffic monitor 120 and the smart AI lock module 303 are implemented on server 150.

Referring back to FIG. 3C, the smart AI lock module 301 works with app usage monitor 120A to directly identify app usage and provide the information to the user consumption block 160. In some embodiments, based on input from smart AI lock module 301, control software 304 may limit or block the app consumption or usage based on the rules set up. In some embodiments, the smart AI lock module 301 may be implemented as part of control software 304 loaded directly into user device 110 and coupled to the operating system to work directly with app usage monitor 120A to limit or block excess app usage.

Figure 4:
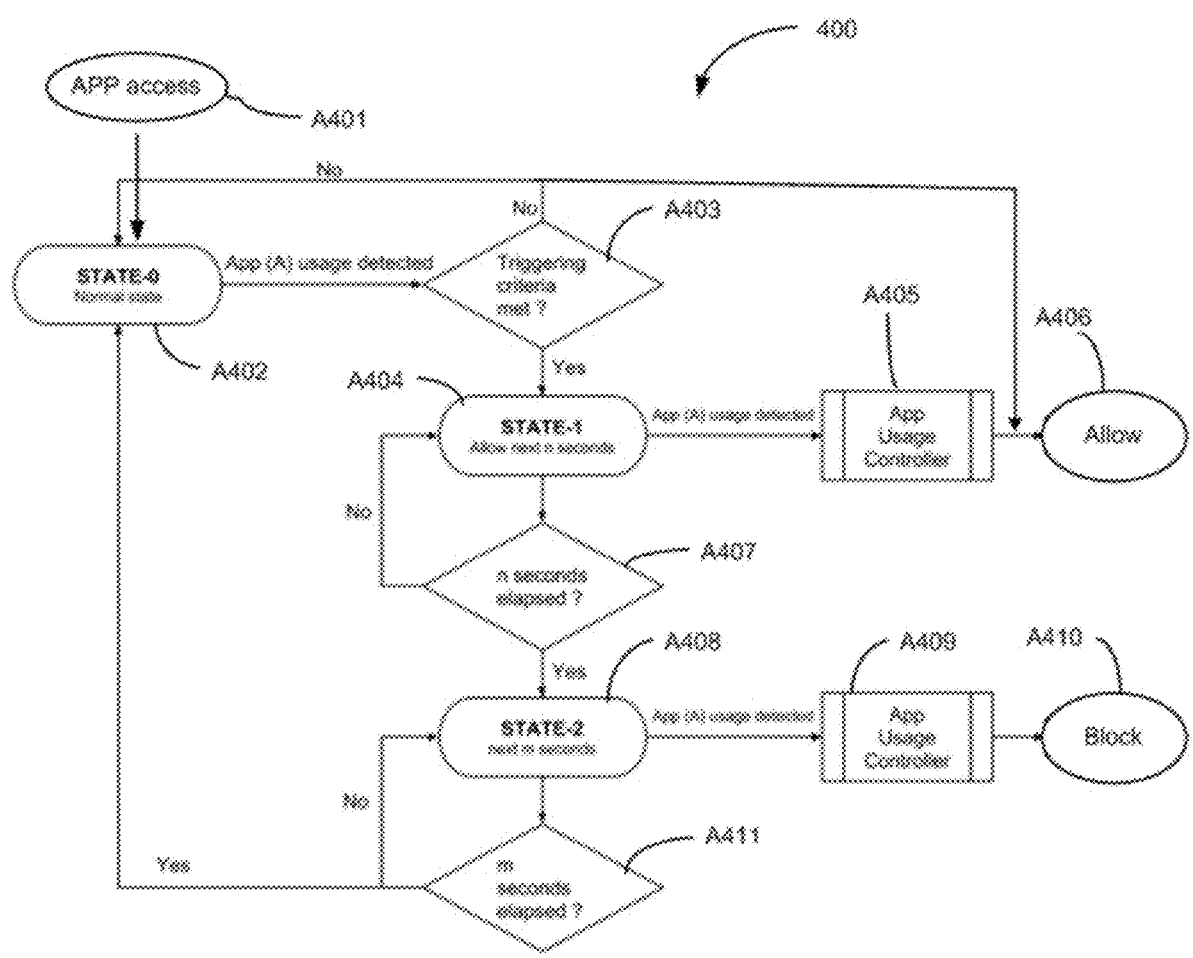
FIG. 4 is a flowchart of a process for smart lock control according to one embodiment.

FIG. 4 is a flowchart of a process for smart lock control according to one embodiment. Process 400 may be performed by processing logic which may include software, hardware, or a combination thereof. For example, process 400 may be performed by server 150 of FIGS. 3A-3C, for example by smart AI lock module 301.

Referring to FIG. 4, starting when App A is accessed at step A401 over the network or web (e.g., network 130), a normal state is established by a variable taking on a value of 0 (labelled as STATE-0) at A402 allowing App A to be allowed as shown at A406.

When an app (e.g., App A) is active, the processing logic determines whether any of the thresholds that trigger the control criteria are met at A403. Triggering criteria may include a time duration for which an app (e.g., App A) is used, a number of times for which the app is used in a particular time interval, or the condition that the app is a subset of a specified group of apps. Triggering criteria are determined by monitoring, for example, network traffic by the appdetector module 180.

If triggering criteria are not met, the processing logic returns back to the normal state with the variable retaining the value 0, and the state variable retains its value of 0 at A402. On the other hand, if triggering criteria are met at A403, then the processing logic moves to a state where the state variable takes a value of 1 (labelled as STATE-1) at A404.

In this state, usage of App A is allowed for the next 'n' seconds as determined by pre-established rules. So once the usage of App A is detected and App A is within the control list for established trigger criteria, an app usage controller (at A405) associated with the appdetector module 180 and the smart AI lock module 301 allows access to App A as normal at A406 while monitoring that the allowed time duration 'n' for which App A is being used based on the rules has not elapsed. The processing logic on the app usage controller at A405 continuously checks whether the allowed time has elapsed at A407.

If 'n' seconds have not elapsed, the processing logic remains in the state where the state variable has a value of 1 (STATE-1), and access to App A is allowed (as at A406) by the app usage controller at A405.

On the other hand, if the allowed 'n' seconds have elapsed since the trigger event as checked at step A407, the processing logic changes state to a new state where the state variable takes on a value of 2 (labelled as STATE-2) at A408. In this state, the app usage controller blocks App A for the next 'm' seconds (as shown at A410) where the blocking for the 'm' period time is also fixed by the pre-established rules.

In this state (STATE-2), the app usage controller associated with the appdetector module 180 and the smart AI lock module 301 blocks the access of user device 110 as shown at A410. The app usage controller continuously determines if the 'm' seconds have elapsed since App A was blocked at A409 or the state variable changed to value of 2 at A408. If 'm' seconds have not elapsed, the processing logic remains in the state where the state variable has the value of 2 (STATE-2), and access to App A continues to be blocked by the app usage controller.

On the other hand, if 'm' seconds have elapsed since App A was blocked at A409 or the state variable changed to value of 2 at A408, then the processing logic returns to the original state where the state variable takes on a value of 0 (STATE-0). This state allows normal usage of App A as at A406. That is, in STATE-0 App A may be accessed for an unlimited number of times and unlimited time duration. The process is repeated over time to limit the usage of App A per the pre-established rules.

Figure 5:
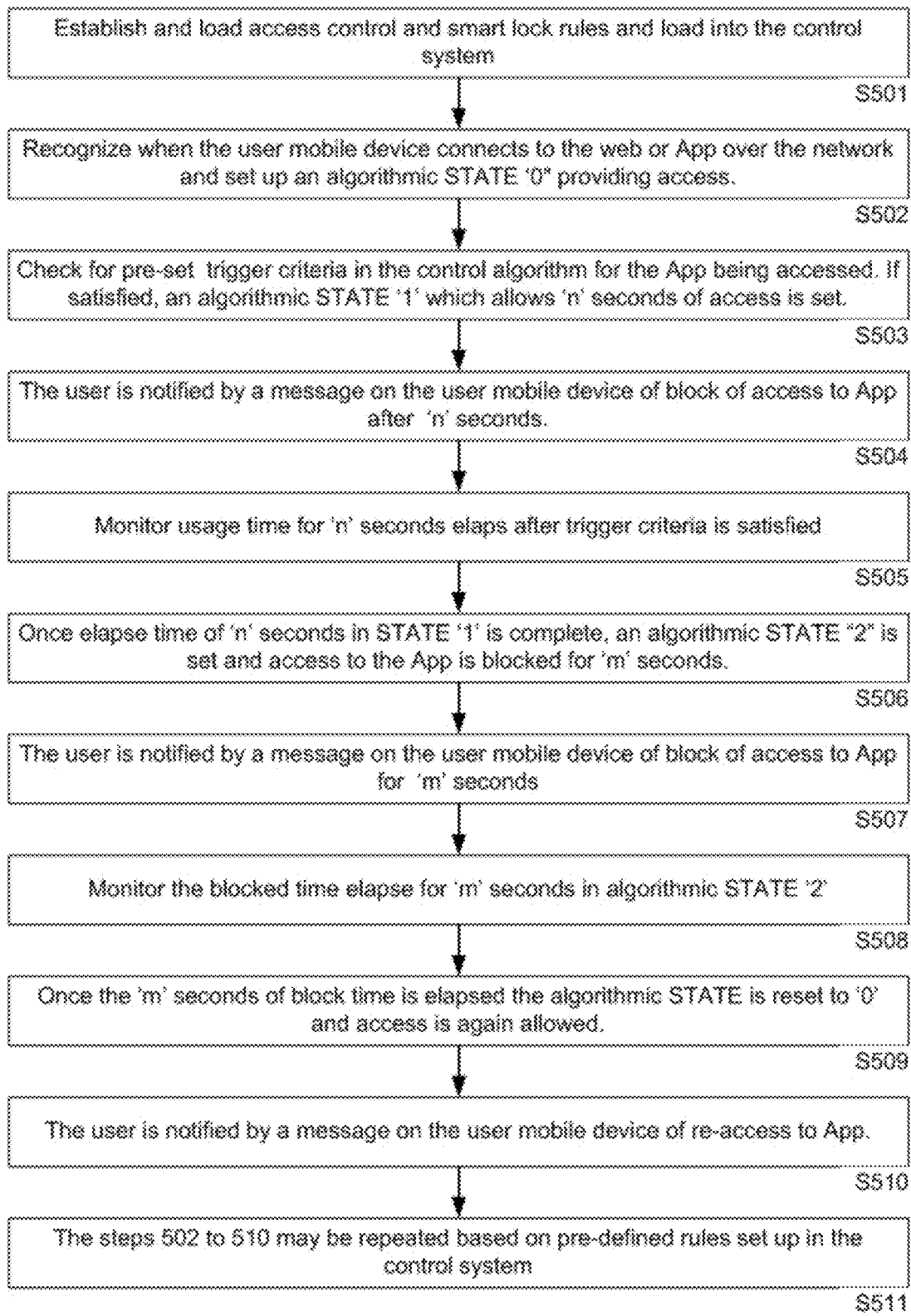
FIG. 5 is flowchart of a process for app control according to one embodiment.

FIG. 5 is flowchart of a process for app control according to one embodiment. Process 500 may be performed by processing logic which may include software, hardware, or a combination thereof. For example, process 500 may be performed by server 150 of FIGS. 3A-3C, for example by smart AI lock module 301. In some embodiments, process 500 may be used to detect and control the following use cases, such as high frequency of use or long usage durations based on usage information collected. This information is available in server 150 via user consumption module 160 and app detector 180 derived from network traffic monitor 120 (as shown in FIGS. 3A-3B) or app usage monitor 120A (as shown in FIG. 3C).

Once a condition or set of conditions are recognized for an app to be controlled and a predefined triggering criteria is met, the app blocking or rationing action is performed. The process is described herein below:

Establish a set of predefined rules for access control of web applications or application programs (apps) accessed over a network (e.g., all apps or chosen specific apps) and enter the rules into the control system for use by the access control algorithm associated with a user device (e.g., user device 110). (S501)

Recognize access of the user device to a web application or app. The access control algorithm on the user device starts off in its normal state (that is STATE-0) where the user device has access to the app. (S502)

When app usage by the user device is detected by the control system and a pre-set rule based <Triggering criteria> is satisfied, the access control algorithm on the user device move to a second state (STATE-1) where the user device is allowed access to the app for a period of 'n' seconds. (S503)

The user of the user device is notified by a message on the user device that this app or group of app's usage will be rationed or disabled soon or in 'n' seconds. (S504)

In STATE-1, the usage time is monitored for elapse of the next 'n' seconds of app usage. (S505)

Once the elapsed time in STATE-1 has completed 'n' seconds, the access controller on the user device places the user device into a third state (STATE-2) where the user device is blocked/rationed for access to the app or the group of related apps for the next 'm' seconds as per pre-established rules. (S506)

Notify the user via a message on the user device of the blocked state of the App and its time duration. (S507)

In STATE-2, the blocked or rationed time is monitored for elapse of the next 'm' seconds of app blockage during which time the blocking/rationing continues. (S508)

Once the elapsed time in STATE-2 for 'm' seconds has completed, the state of the user device is set back to the normal state (which is STATE-0) with access allowed to the app. (S509).

Notify the user via a message on the user device of the blocked state of the app and its time duration. (S510)

The above steps S502 to S510 may be repeated as below based on the follow-on rules pre-defined in the system (S511).
1. Only once
2. Automatically every time
3. 'X' number of times during a particular period (say in the morning)

Though the above logic processes are shown to be running on the user device and app server (e.g., server 150), it is not meant to be limiting. The process can also be run in backend servers of the system.

Detection logic also can be enabled automatically by the system or based on a user action.

Apps monitored and controlled can be individual apps or a group of apps.
G: Let G be the group of apps that are being monitored, where G is a group of apps that can include:
all apps installed on the user device
a single app
apps based on a particular category such as (but not limited to):
Social apps
Messaging apps
Distraction apps
custom sub-set of apps based on selection of user
A: Let A be the current app detected,
where A is any app or web application
Triggering Criteria
Multiple models are defined to trigger the transition from STATE-0 to STATE-1. Three such examples are shown below:
Condition 1:
If (G contains A) AND (screen is not locked—locked screen makes any app running to be in the background) AND
(A.current_session.seconds_consumed>min_threshold_in_seconds)
Condition 2:
If (G contains A) AND (screen is not locked) AND (A.last_period.number_of_sessions>min_threshold_sessions)
Condition 3:
If (G contains A) AND (screen is not locked) AND (A.last_period.frequency>min_threshold_frequency)
{A.current_session}: is the current session of App A. and a 'session' can have multiple definitions and is configurable.
Definition of "session" is:
any usage of at least 'n' seconds,
Multiple usages of 'n' seconds which are spaced <'m' seconds are considered as part of same Session
{A.last_period}: period of time in seconds. For example, "in the last 15 minutes."

As is well understood, in one embodiment, control is mainly applicable to user initiated apps or web connections. Essentially, user-initiated network requests (i.e., foreground apps) are mostly associated with the user device being operated in a mode where the screen is unlocked. Hence, the smart usage monitoring algorithm uses the screen locked state (if available) in addition to access to apps to determine whether a specific network request or app is associated with a user of the user device. In another embodiment, control is applicable to non-user initiated apps or web connections to limit distractions.

As previously discussed, triggering criteria depends on what is controlled. There can be one triggering criteria for a group of apps or different triggering criteria for different apps in a group or different groups of apps. Triggering criteria and blocking duration can be personalized for each individual user based on user settings or on optimization algorithm. In one embodiment this optimization algorithm can also be based on age or age-group of the user. For example, an optimization algorithm may change parameters such as 'n' and 'm' seconds mentioned above, or trigger criteria (e.g., a number of times an app is launched) for each user and try to find an optimal setting based on explicit user feedback. Logic of transitioning from one state to next (STATE-0 to STATE-1 to STATE-2 to STATE-0) can be based on a single app or group of apps or set of different sub-groups of apps.

Once the smart AI lock module 301 shown in FIGS. 3A and 3B detects that the user device 110 needs to be in the control mode (STATE '2'), this information is signaled to the network traffic control module 303. The set of rules that needs be applied are passed to the network traffic control module 303. In one embodiment, network traffic control module 303 is synced with STATE changes by using either pull or poll, or both mechanisms. If in STATE-2, for example, all of the control rules are applied to network traffic and depending on the application, traffic is either BLOCKED or ALLOWED. In some embodiments, such system 300C shown in FIG. 3C, an operating system has built-in capabilities or software for monitoring and control (i.e., app usage monitor 120A) that is added to the user device 110 to handle the monitoring and control function in conjunction with the operating system.

Figure 6:
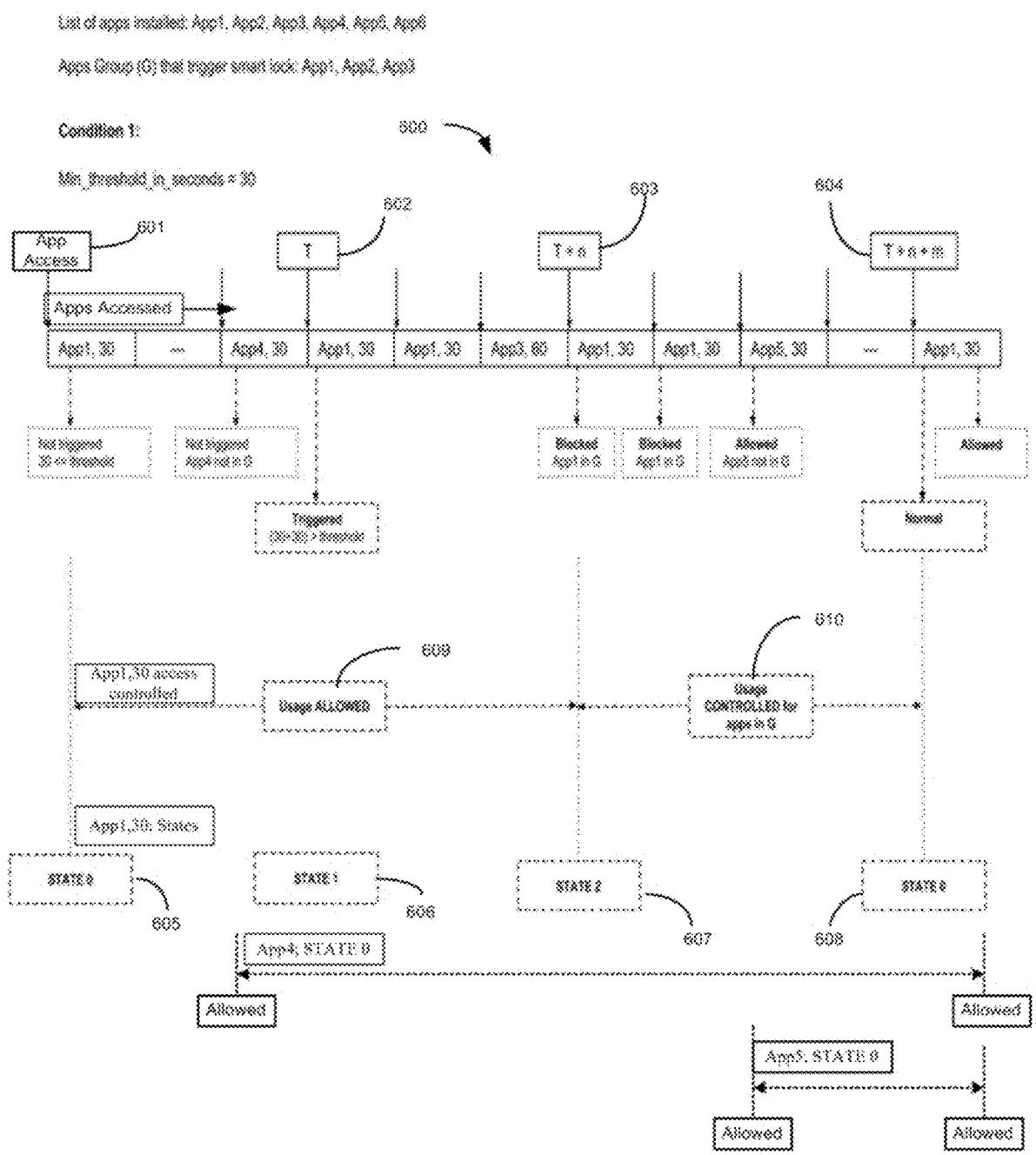
FIG. 6 is an exemplary diagram of a timeline having triggering criteria according to one embodiment.

FIG. 6 is an exemplary diagram of a timeline having triggering criteria according to one embodiment. In FIG. 6, timeline (or timing diagram) 600 depicts triggering criteria associated with Condition 1. This timing diagram 600 is associated with an embodiment where a user device (e.g., user device 110) accessing a group of apps G comprising App1 to App6. In the G group of apps the access control and triggering criteria are implemented only for App1 to App3 and for App4 to App6. There is no access control and triggering criteria set up in the system. The usage or consumption of App1 by the user device is shown to exceed the thresholds set for control.

Since only App1 to App3 are included in the set requiring control, under Condition 1 the controlled App1 to App3 usages are timed and controlled to be allowed for 'n' seconds followed by 'm' seconds when App1 to App3 are to be blocked from consumption on the user device. The rest of the apps accessed from group G are not controlled for consumption on the user device.

At start access 601 by the App1, it is recognized by the system, the access control algorithm places App1 STATE status into STATE 0 (605), which is the normal condition when App1 is allowed to be consumed. In timeline 600, the terminology (AppX, Y) denotes an AppX being used for Y seconds. Since 30 seconds is less than or equal to the threshold (here, the minimum threshold is set to be 30 seconds), the triggering criteria are not met, and the system remains at STATE 0 (i.e., the state variable has a value of 0). Usage of App1 by the user is allowed in this case. The access control of the monitoring and control system checks and recognizes App1 at time 'T'' (602) as a controlled app in group G. App1 STATE status is changed by the access control algorithm from '0' to '1' that is from allow to allow for 'n' seconds at time 'T' (602). The STATE status is changed as the triggering criteria are met since 60 seconds (30+30) is greater than or equal to the threshold. Under STATE 1 (606), in one embodiment, the monitoring and control system starts monitoring the elapsed time of consumption of App1. In another embodiment, the monitoring and control system starts monitoring the elapsed time since entering into STATE 1 irrespective of whether App1 is used or not. During the STATE 0 (605) and STATE '1' (606) the consumption of App1 is allowed (as shown by 609). When the elapsed time has crossed 'n' seconds, the 'n' seconds being the allowed session, the App1 STATE status is changed from '1' to '2' by the access control algorithm at 'T+n' (603). Under STATE '2' (607) the access control system blocks App1 from being consumed by the user device. That is, once the App1 STATE status has changed to STATE '2' (607), the access control system blocks the consumption of App1 for a period of 'm' seconds (as shown by 610). The elapsed time from STATE '2' (607) is monitored by the monitoring and control system to account for the 'm' seconds. Once the 'm' seconds have elapsed at 'T+n+m' (604) the access control algorithm changes the STATE status of App1 to a normal state by setting the STATE status to '0'. At this STATE '0' (608) the control and monitoring system allows the consumption of App1 by the user device.

Figure 7:
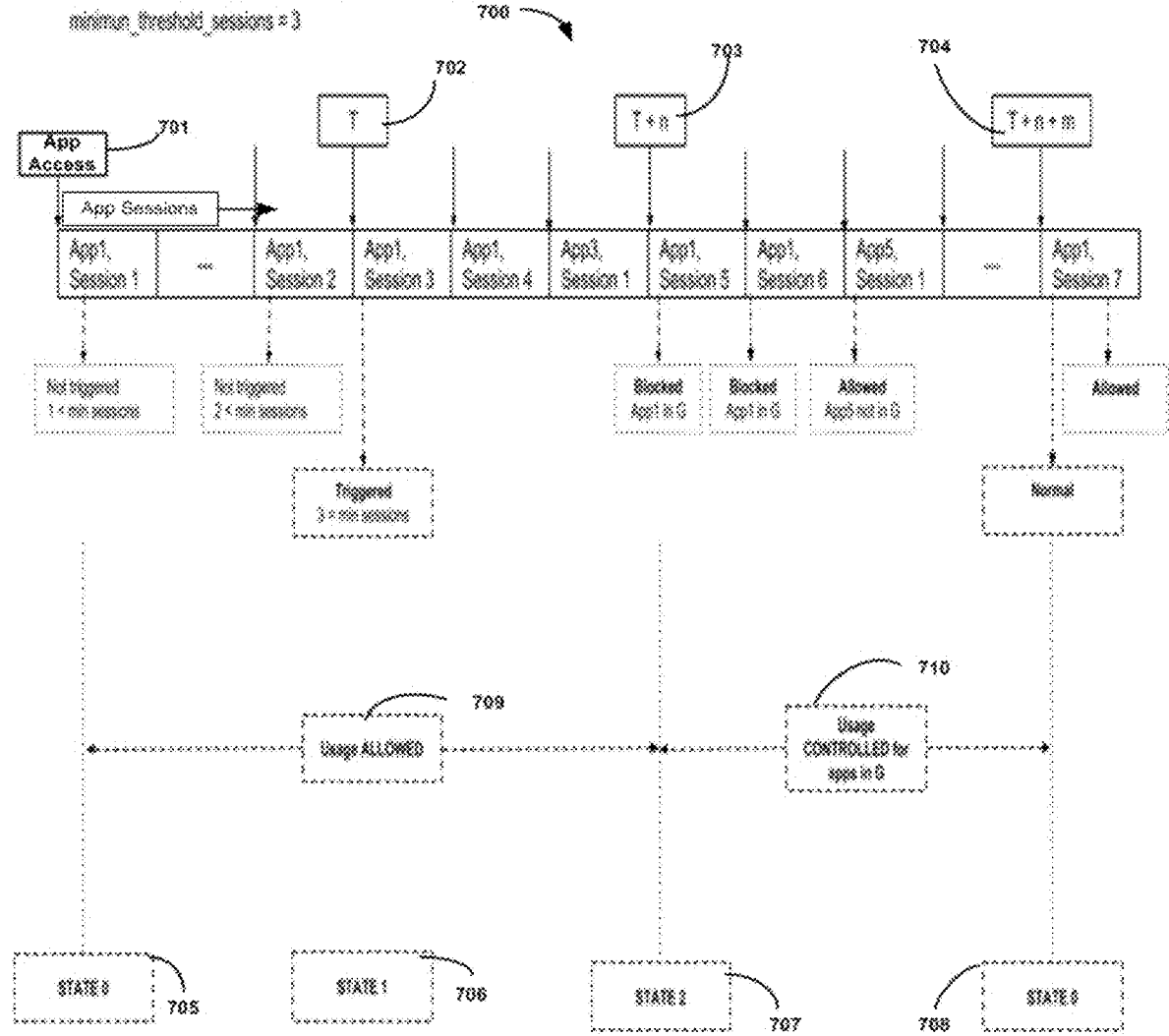
FIG. 7 is an exemplary diagram of another timeline having triggering criteria according to one embodiment.

FIG. 7 is an exemplary diagram of another timeline having triggering criteria according to one embodiment. In FIG. 7, timing diagram or timeline 700 depicts triggering criteria associated with app access sessions or periods of access associated with Condition 2. This timing diagram 700 is associated with an embodiment where a user device (e.g., user device 110) accessing a group of apps G having App1 to App6. In the group of apps G, the access control and triggering criteria are implemented only for App1 to App 3 and for App4 to App6. There is no access control and triggering criteria set up in the system similar to the previous instance described in FIG. 6. But since App1, App 2 and App3 are part of group G and the session based access control is established for the group G, the usage or consumption of the apps in group G by the user device is shown to exceed the threshold of sessions set for control and apps access control is engaged to limit or block consumption of the apps in group G in accordance with pre-set rules.

This timing diagram 700 is associated with an embodiment where a user device (e.g., user device 110) accessing a group of apps G having App1 to App6. In the group of apps G, the access control and triggering criteria are implemented only for App1 to App 3 and for App4 to App6. There is no access control and triggering criteria set up in the system. The current triggering criteria set up is by evaluation of the sessions of access by the control group of apps G, which has the controlled apps (App1 to App3). The usage or consumption of of the apps in group G by the user device is shown to exceed the threshold of sessions set for control, for the control to be active across all STATEs. In this case the minimum number of sessions is set to three.

In FIG. 7, when an app from group G, which includes controlled apps (App1, App2 and App3), starts in a first session, the access control system recognizes the group G and places the STATE status of group G into STATE '0' (as indicated at 705) which allows the session consuming the apps from group G to continue normally (as at 701). This continues for the first two sessions of use. Since 1 and 2 sessions are less than the number of sessions set as threshold, which is set to 3, no action is initiated at these times as trigger criteria is not met. When the user starts up a third session the trigger criteria is met and the control system recognizes App1 as an app to be controlled from within group G and causes group G STATE status to be changed by the access control algorithm from '0' to '1', as at 'T' (702). The change in STATE status at T (702) from '0' to '1'. Under STATE '1' (706) the consumption of App1 is changed from allowing normal consumption to allowing consumption for an 'n' number of sessions (as shown at 709). At STATE '1'

(706) the access control system starts keeping a count of the sessions of the app the user starts. When the number of sessions after T has crossed 'n' in number, at 'T+n' (703) the state status is changed to '2' from '1'. Under STATE '2' (707), the access of the apps from group G are all blocked for 'm', sessions by the user device. The access control system continues keeping a count of the sessions of app the user starts during the blocked period (710). When the session starts have exceeded the 'm' at sessions 'T+n+m' (at 704), group G STATE status is changed by the access control algorithm from '2' to '0'. Allowing the apps from group G to continue accessing the net for consumption of the apps from Group G.

These sequences can be repeated if rules are pre-set to provide control of consumption of App1, or group G by the user device over multiple access periods.

The access control system is set up to provide status information to the user over a graphical user interface on the user device. Typically, the user interface of the system comprises a display screen and a key pad of the user device. The graphical user interface (GUI) based user interface is typically configured to provide two types of information to the user and where needed get inputs from the user. The two types of information comprise:

1. Contextual prompt when a trigger-criteria is reached and a feature is not enabled; and
2. Informational outputs when a trigger criterion is reached and feature is already enabled.

This may include a way for user to temporarily disable the access block.

FIG. 8 is an example of a contextual prompt according to one embodiment. In FIG. 8, a contextual prompt 810 with a request to turn on (i.e., enable) the smart usage monitoring and control program may be prompted on a screen of a user device (e.g., screen 250 of user device 110). In this example, the contextual prompt 810 may be called the "Zen Breaks".

Figure 9A:
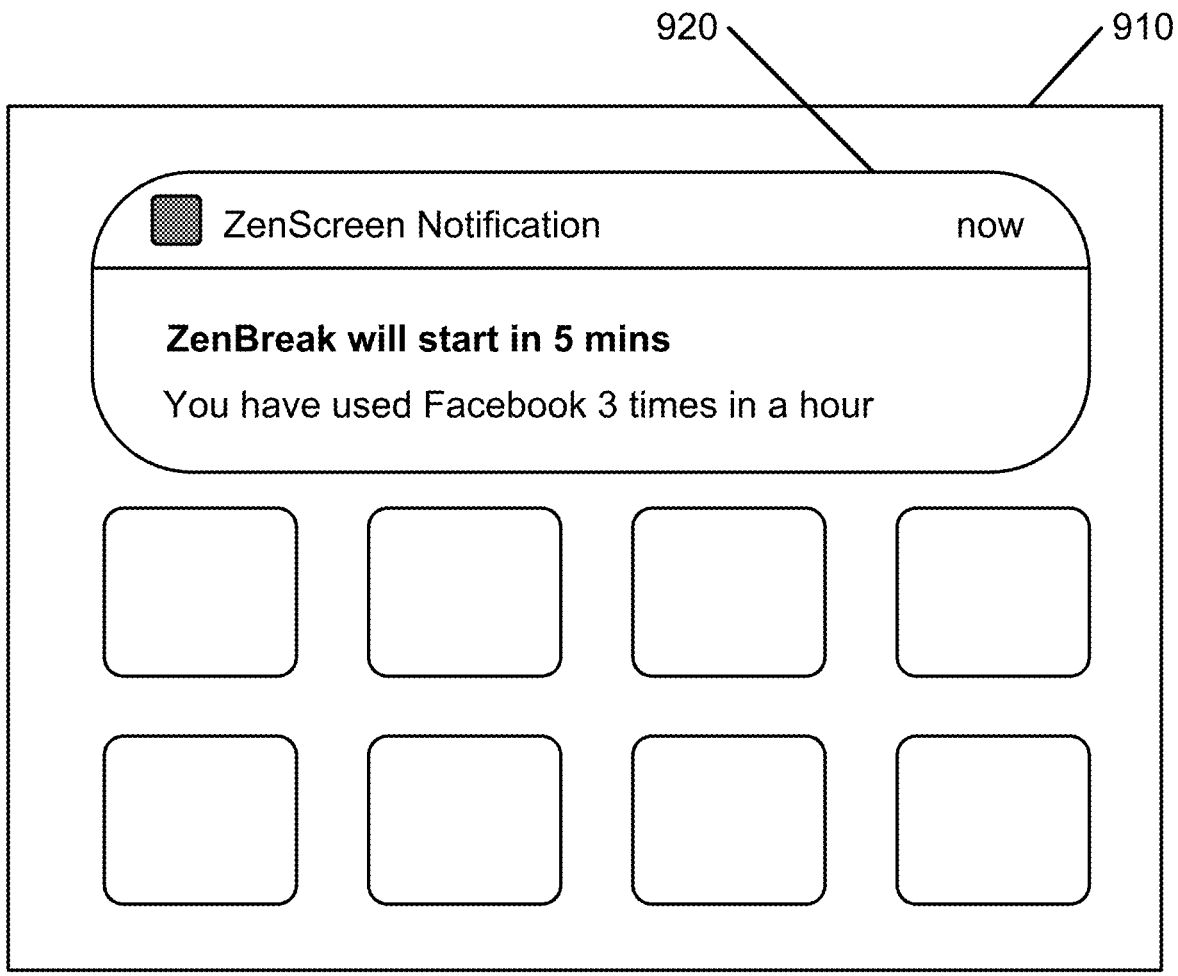
FIG. 9A is an exemplary informational output displayed over a user interface of a user device according to one embodiment.
Figure 9B:
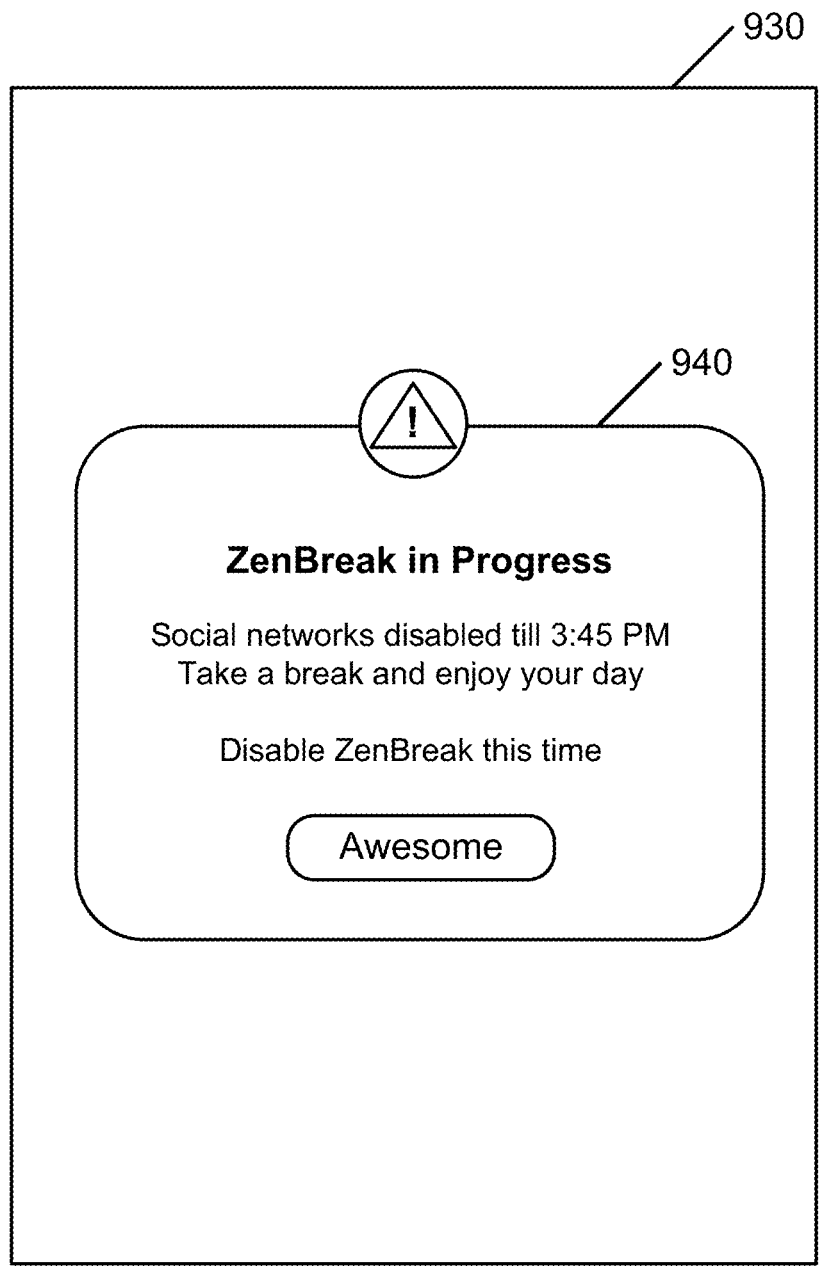
FIG. 9B is another exemplary informational output displayed over a user interface of a user device according to one embodiment.
Figure 9C:
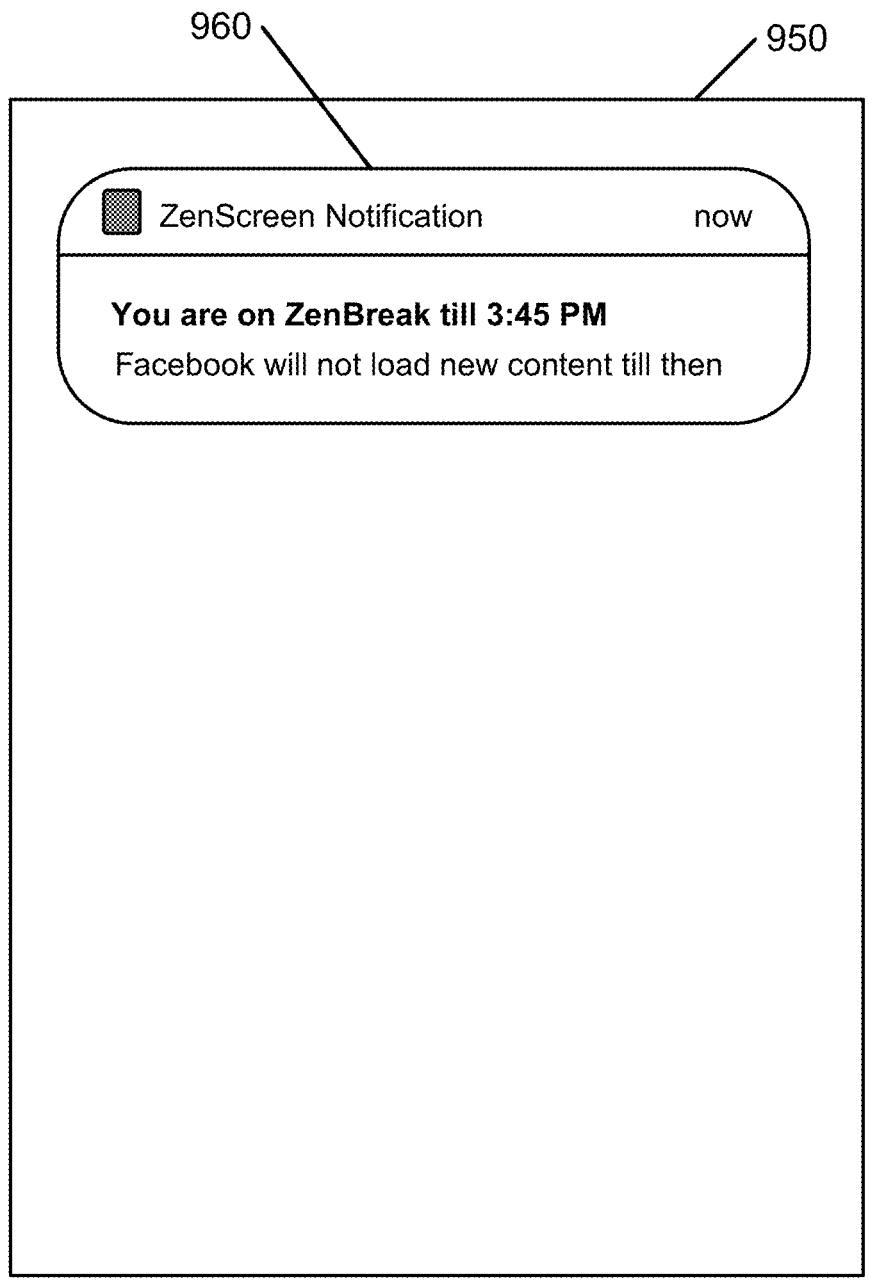
FIG. 9C is yet another exemplary informational output over a user interface of a user device according to one embodiment.

FIGS. 9A, 9B and 9C are examples of informational outputs that provide a user of a user device having a smart monitoring and control program running thereon.

Referring to FIG. 9A, which is an exemplary informational output displayed over a user interface of a user device according to one embodiment, an informational output 920 is displayed over a user interface or GUI 910 of the user device (e.g., a home screen) informing the user that a control break (shown in FIG. 9A as "ZenBreak") will start in 5 minutes, and that the user has used a social networking app (e.g., Facebook) 3 times in an hour. In one embodiment, the informational output 920 may be displayed as a notification (which may be termed as "ZenScreen Notification") that is provided as a push notification.

Referring to FIG. 9B, which is another exemplary informational output displayed over a user interface of a user device according to one embodiment, an informational output 940 is displayed over a user interface or GUI 930 of the user device (e.g., a screen from a particular app) informing a user that a break is in progress (shown in FIG. 9B as "ZenBreak in Progress") with the apps in a group including all of the Apps in the social networks. The displayed break also provides the opportunity for the user
- to disable the system (termed as "ZenBreak").
- to skip the break temporarily (skips can be limited per day).

Referring to FIG. 9C, which is yet another exemplary informational output over a user interface of a user device according to one embodiment, an informational output 960 is displayed over a user interface or GUI 950 of the user device (e.g., a screen from a particular app) is shown. The informational output informs the user that the system is in a blocked state for a period of time (e.g., until 3:45 PM as shown) in accordance with rules set up. In one embodiment, the informational output 960 may be displayed as a notification (which may be termed as "ZenScreen Notification") that is provided as a push notification.

Figure 10:
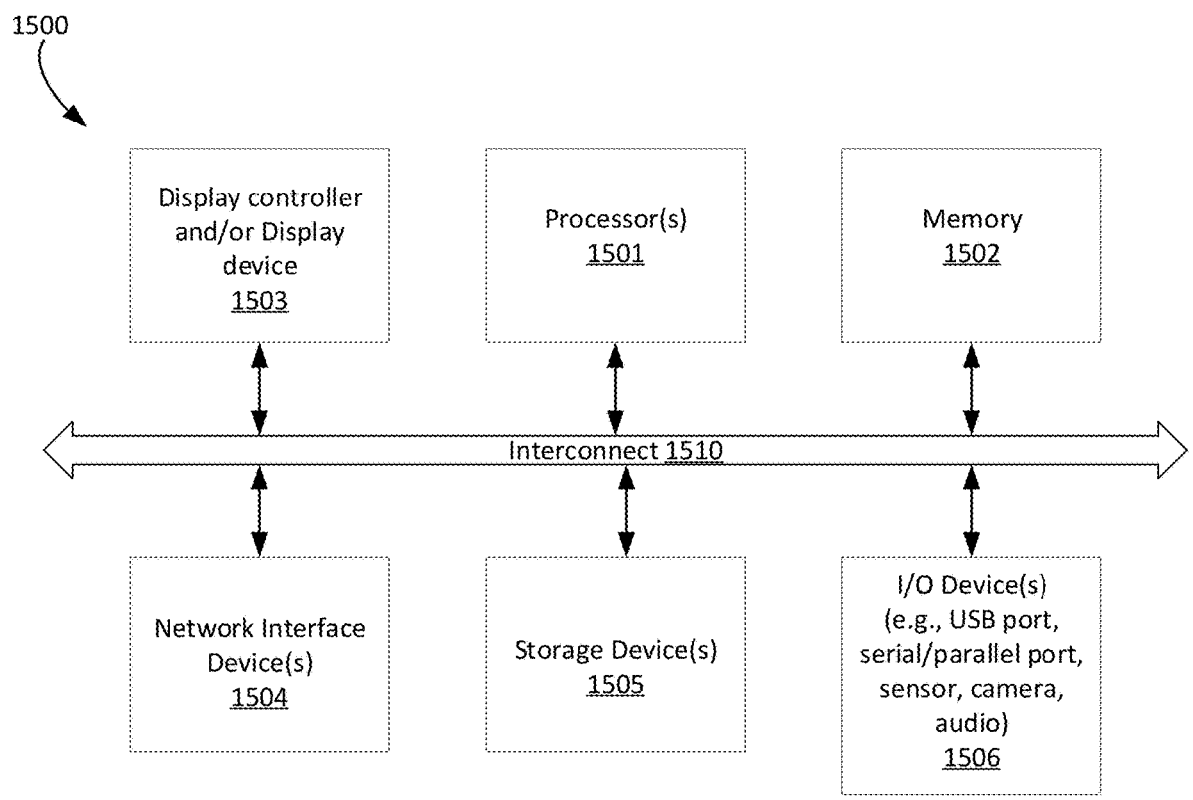
FIG. 10 is an exemplary block diagram of a data processing system according to one embodiment.

FIG. 10 shows an exemplary block diagram of a data processing system which may be used with one embodiment of the invention. For example, system 1500 may represent any of data processing systems described above performing any of the processes or methods described above, such as, for example, app server 150 of FIGS. 1A-1C and 3A-3C. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes one or more processors 1501, memory 1502, and devices 1504-1506 coupled or connected to one another via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1503, which may include a display controller, a graphics processor, and/or a display device.

Processor 1501 may communicate with memory 1502, which in one embodiment can be implemented via multiple memory devices to provide for a given amount of system memory. Memory 1502 may include one or more volatile storage (or memory) devices such as random access memory (RAM), dynamic RAM (DRAM), synchronous DRAM (SDRAM), static RAM (SRAM), or other types of storage devices. Memory 1502 may store information including sequences of instructions that are executed by processor 1501, or any other device. For example, executable code and/or data of a variety of operating systems, device drivers, firmware (e.g., input output basic system or BIOS), and/or applications can be loaded in memory 1502 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1504-1506, including network interface device(s) 1504, storage device(s) 1505, and IO device(s) 1506. Network interface device 1504 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Storage device(s) 1505 may include computer-accessible storage medium (also known as a machine-readable storage medium or a computer-readable medium) on which is stored one or more sets of instructions or software (e.g., module, unit, and/or logic) embodying any one or more of the methodologies or functions described herein. The processing module/unit/logic may represent any of the components described above, such as, for example, network traffic monitor 120, App Usage Monitor 120A with control software 304, user consumption module 160, app detector 180, smart AI lock module 301, and network traffic control module 303 (alone or in combination). The processing module/unit/logic may also reside, completely or at least partially, within memory 1502 and/or within processor 1501 during execution thereof by data processing system 1500, memory 1502 and processor 1501 also constituting machine-accessible storage media. The processing module/unit/logic may further be transmitted or received over a network via network interface device 1504.

The computer-readable storage medium may also be used to store the some software functionalities described above persistently. While the computer-readable storage medium in an exemplary embodiment may be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

The processing module/unit/logic, components and other features described herein can be implemented as discrete hardware components or integrated in the functionality of hardware components such as ASICS, FPGAs, DSPs or similar devices. In addition, the processing module/unit/logic can be implemented as firmware or functional circuitry within hardware devices. Further, the processing module/unit/logic can be implemented in any combination hardware devices and software components.

IO devices 1506 may include an audio device. An audio device may include a speaker and/or a microphone to facilitate voice-enabled functions, such as voice recognition, voice replication, digital recording, and/or telephony functions. IO devices 1506 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1506 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed in part by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for controlling software application usage by a plurality of users using respective user devices, the method comprising:

for each user of the plurality of users, receiving user inputs, from a respective user device of the user, as user preferences of the user;

establishing rules for the user on the user's respective user device to control application usage behavior of the user based on the received user inputs, wherein the user preferences include a first user preference that includes a specific usage pattern of a software application that generates a trigger and a second user preference that includes an action performed on application usage of the software application, wherein the second user preference is set by the user on the user's respective user device, and the software application comprises an application program or a web application;

detecting a network access to the software application over a web on the user's respective user device;

monitoring and identifying the application usage of the software application by the user;

establishing a plurality of triggering criteria based on the established rules and the identified application usage of the software application, to control the application usage behavior of the user on the user's respective user device, wherein the triggering criteria comprise a determination of whether a number of sessions of the software application the user starts during a previous time period has reached a minimum sessions threshold;

controlling the application usage behavior of the user based on the plurality of triggering criteria; and notifying the user, via at least one informational output displayed over a user interface of the user's respective user device, of the action performed on the application usage of the software application and information relating to when the triggering criteria are reached.

2. The method of claim 1, wherein the triggering criteria include at least one of: a time duration the software application is used, a number of times the software application is used in a particular time interval, or a condition that the software application is a subset of a specific group of applications.

3. The method of claim 1, wherein the software application is one of: a social networking application, a video sharing application, or a video streaming application.

4. The method of claim 1, wherein controlling the application usage behavior based on the triggering criteria and the second user preference comprises:

establishing a first state associated with the software application;

determining whether the triggering criteria is satisfied;

in response to determining that the triggering criteria is satisfied, moving to a second state associated with the software application, wherein access to the software application is enabled for a first time period in the second state;

determining whether the first time period has elapsed; and in response to determining that the first time period has elapsed, moving to a third state associated with the software application, wherein access to the software application is disabled for a second time period in the third state;

notifying the user of the action performed on the application usage of the software application and the information relating to when the triggering criteria are reached comprises:

notifying the user, via a first informational output displayed over a user interface of the user's respective user device, that the software application will be disabled at the end of the first time period.

5. The method of claim 4, wherein controlling the application usage behavior based on the triggering criteria further comprises:

determining whether the second time period has elapsed, and in response to determining that the second time period has elapsed, returning to the first state, wherein normal access to the software application is enabled in the first state;

notifying the user of the action performed on the application usage of the software application and the information relating to when the triggering criteria are reached further comprises:

notifying the user, via a second informational output displayed over the user interface of the user's respective user device, that the software application will be enabled at the end of the second time period.

6. The method of claim 4, wherein notifying the user of the action performed on the application usage of the software application and the information relating to when the triggering criteria are reached further comprises:

in response to determining that the first time period has elapsed, notifying the user, via a second informational output displayed over the user interface of the user's respective user device, that access to the software application is disabled for the second time period.

7. The method of claim 6, wherein notifying the user comprises sending a push notification to the user.

8. The method of claim 4, wherein notifying the user that the software application will be disabled at the end of the first time period comprises:

notifying the user that blockage of access to the software application will start after the first time period and that the user has used the software application for a number of times within that particular time interval.

9. The method of claim 1, wherein notifying the user of the action performed on the application usage of the software application and the information relating to when the triggering criteria are reached comprises providing the user with an option to disable or skip the action performed on the application usage of the software application.

10. The method of claim 1, further comprising:

providing the user, via the at least one informational output, an option to disable or skip the action performed on the application usage of the software application.

11. A non-transitory machine-readable medium having instructions stored therein, which when executed by a processor, cause the processor to perform operations, the operations comprising:

for each user of a plurality of users using respective user devices, receiving user inputs, from a respective user device of the user, as user preferences of the user;

establishing rules for the user on the user's respective user device to control application usage behavior of the user based on the received user inputs, wherein the user preferences include a first user preference that includes a specific usage pattern of a software application that generates a trigger and a second user preference that includes an action performed on application usage of the software application, wherein the second user preference is set by the user on the user's respective user device, and the software application comprises an application program or a web application;

detecting access to the software application on the user's respective user device;

monitoring and identifying the application usage of the software application by the user;

establishing a first state associated with the software application;

determining whether a plurality of triggering criteria are satisfied, wherein the triggering criteria are established using the established rules and the identified application usage of the software application, to control the application usage behavior of the user;

in response to determining that a first triggering criterion of the plurality of triggering criteria is satisfied, controlling the application usage behavior of the user based on the second user preference, as set by the user on the user's respective user device, by:

moving to a second state associated with the software application, wherein access to the software application is enabled for a first time period in the second state, counting a number of sessions of the software application the user starts, and notifying the user, via a first informational output displayed over a user interface of the user's respective user device, that access to the software application will be disabled after the first time period;

determining whether the first time period has elapsed;

in response to determining that the first time period has elapsed and a second triggering criterion of the plurality of triggering criteria is satisfied, wherein the second triggering criterion is satisfied when it is determined that the number of sessions of the software application the user starts during a previous time period has reached a minimum sessions threshold, moving to a third state associated with the software application, wherein access to the software application is disabled for a second time period in the third state, continue counting the number of sessions of the software application the user starts, and notifying the user, via a second informational output displayed over the user interface of the user's respective user device, that access to the software application is disabled for the second time period;

in response to determining that a third triggering criterion of the plurality of triggering criteria is satisfied in the third state, notifying the user, via a third informational output displayed over the user interface of the user's respective user device, that access to the software application will be enabled after the second time period;

determining whether the second time period has elapsed; and in response to determining that the second time period has elapsed, returning to the first state, wherein normal access to the software application is enabled in the first state.

12. The non-transitory machine-readable medium of claim 11, wherein the triggering criteria include at least one of: a time duration the software application is used, a number of times the software application is used in a particular time interval, or a condition that the software application is a subset of a specific group of applications.

13. The non-transitory machine-readable medium of claim 11, wherein notifying the user that access to the software application will be disabled after the first time period comprises sending a push notification to the user to notify the user that blockage of access to the software application will start after the first time period and that the user has used the software application for a number of times within a particular time interval.

14. The non-transitory machine-readable medium of claim 11, wherein the operations further comprise:

in response to determining that the second time period has elapsed, notifying the user, via a fourth informational output displayed over the user interface of the user's respective user device, that access to the software application is enabled.

15. The non-transitory machine-readable medium of claim 11, wherein the operations further comprise:

in the third state, providing the user, via the second informational output, an option to disable or skip the disablement of the access to the software application.

16. A data processing system, comprising:

a processor; and a memory coupled to the processor to store instructions, which when executed by the processor, cause the processor to perform operations, the operations including:

for each user of a plurality of users using respective user devices, receiving user inputs, from a respective user device of the user, as user preferences of the user;

establishing rules for the user on the user's respective user device to control application usage behavior of the user based on the received user inputs, wherein the user preferences include a first user preference that includes a specific usage pattern of a software application that generates a trigger and a second user preference that includes an action performed on application usage of the software application, wherein the second user preference is set by the user on the user's respective user device, and the software application comprises an application program or a web application;

detecting access to the software application on the user's respective user device;

monitoring and identifying the application usage of the software application by the user;

establishing a plurality of triggering criteria based on the established rules and the identified application usage of the software application, to control the application usage behavior of the user on the user's respective user device;

establishing a first state associated with the software application;

notifying the user, via a first informational output displayed over a user interface of the user's respective user device, that access to the software application is enabled;

determining whether a first triggering criterion of the plurality of triggering criteria is satisfied;

in response to determining that the first triggering criterion is satisfied, controlling the application usage behavior of the user based on the second user preference, as set by the user on the user's respective user device, by:

moving to a second state associated with the software application, wherein access to the software application is enabled for a first time period in the second state, counting a number of sessions of the software application the user starts, notifying the user, via a second informational output displayed over the user interface of the user's respective user device, that access to the software application will be disabled after the first time period, and determining whether the first time period has elapsed; and in response to determining that the first time period has elapsed and a second triggering criterion of the plurality of triggering criteria is satisfied, wherein the second triggering criterion is satisfied when it is determined that the number of sessions of the software application the user starts during a previous time period has reached a minimum sessions threshold, moving to a third state associated with the software application, wherein access to the software application is disabled for a second time period in the third state, and notifying the user, via a third informational output displayed over the user interface of the user's respective user device, that access to the software application is disabled.

17. The data processing system of claim 16, wherein the operations further include:

determining whether the second time period has elapsed; and in response to determining that the second time period has elapsed, returning to the first state, wherein normal access to the software application is enabled in the first state.

18. The data processing system of claim 16, wherein the triggering criteria include at least one of: a time duration the software application is used, a number of times the software application is used in a particular time interval, or a condition that the software application is a subset of a specific group of applications.

19. The data processing system of claim 16, wherein the operations further include:

in the third state, providing the user, via the third informational output, an option to disable or skip the disablement of the access to the software application.

* * * * *